United States Patent [19]

Fogg

[11] Patent Number: 5,509,039
[45] Date of Patent: Apr. 16, 1996

[54] AUTOMATIC PELLET STACK LENGTH RECORDING SWITCH

[75] Inventor: James L. Fogg, Columbia, S.C.

[73] Assignee: Westinghouse Electric Corporation, Pittsburgh, Pa.

[21] Appl. No.: 262,429

[22] Filed: Jun. 20, 1994

[51] Int. Cl.$^6$ ................................................. G21C 17/00
[52] U.S. Cl. ........................... 376/245; 376/248; 376/258
[58] Field of Search ...................................... 376/261, 245, 376/248, 259, 258; 361/173; 29/723; 53/504

[56] References Cited

U.S. PATENT DOCUMENTS

| | | | |
|---|---|---|---|
| 3,994,157 | 11/1976 | Burk et al. | 73/94 |
| 4,195,411 | 4/1980 | Gerkey | 33/143 |
| 4,349,112 | 9/1982 | Wilks et al. | 209/538 |
| 4,748,798 | 6/1988 | Udaka et al. | 53/504 |
| 4,762,665 | 8/1988 | Billington et al. | 376/261 |
| 4,842,808 | 6/1989 | Rieben et al. | 376/261 |
| 4,980,119 | 12/1990 | Schoenig, Jr. et al. | 376/261 |
| 5,222,165 | 6/1993 | Bohlinger | 305/16 |
| 5,251,244 | 10/1993 | Wazybok et al. | 376/261 |

*Primary Examiner*—Donald P. Walsh
*Assistant Examiner*—Meena Chelliah

[57] ABSTRACT

A pellet stack length recording switch, for use in a measurement system having a movable measuring head and a measuring device for measuring a length of a nuclear fuel pellet stack segment, includes a probe for contacting and applying a compression force to an end of the pellet stack segment, a compression spring having a predetermined compression force and cooperating with the measuring head and the probe, a pin mechanism attached to the probe, and a sensor for sensing a position of the pin mechanism and outputting a position signal for triggering a measurement by the measuring device of the length of the pellet stack segment when the compression force applied by the probe is at least equal to the predetermined compression force. The probe may include a slider block, for compressing the spring, and a probe member attached to the slider block. The pin mechanism may include a trip screw for tripping the sensor. The slider block may have a bore running therethrough for positioning the pin mechanism and the spring therein, and the measuring head may have a leg and a bore running therethrough for positioning a shaft of the pin mechanism therein. The sensor may be a Fiber optic sensor having a light beam which is broken by the pin mechanism. The switch may further include a foot switch cooperating with the sensor for triggering a measurement by the measuring device whenever the foot switch is closed and the light beam of the fiber optic sensor is broken.

18 Claims, 9 Drawing Sheets

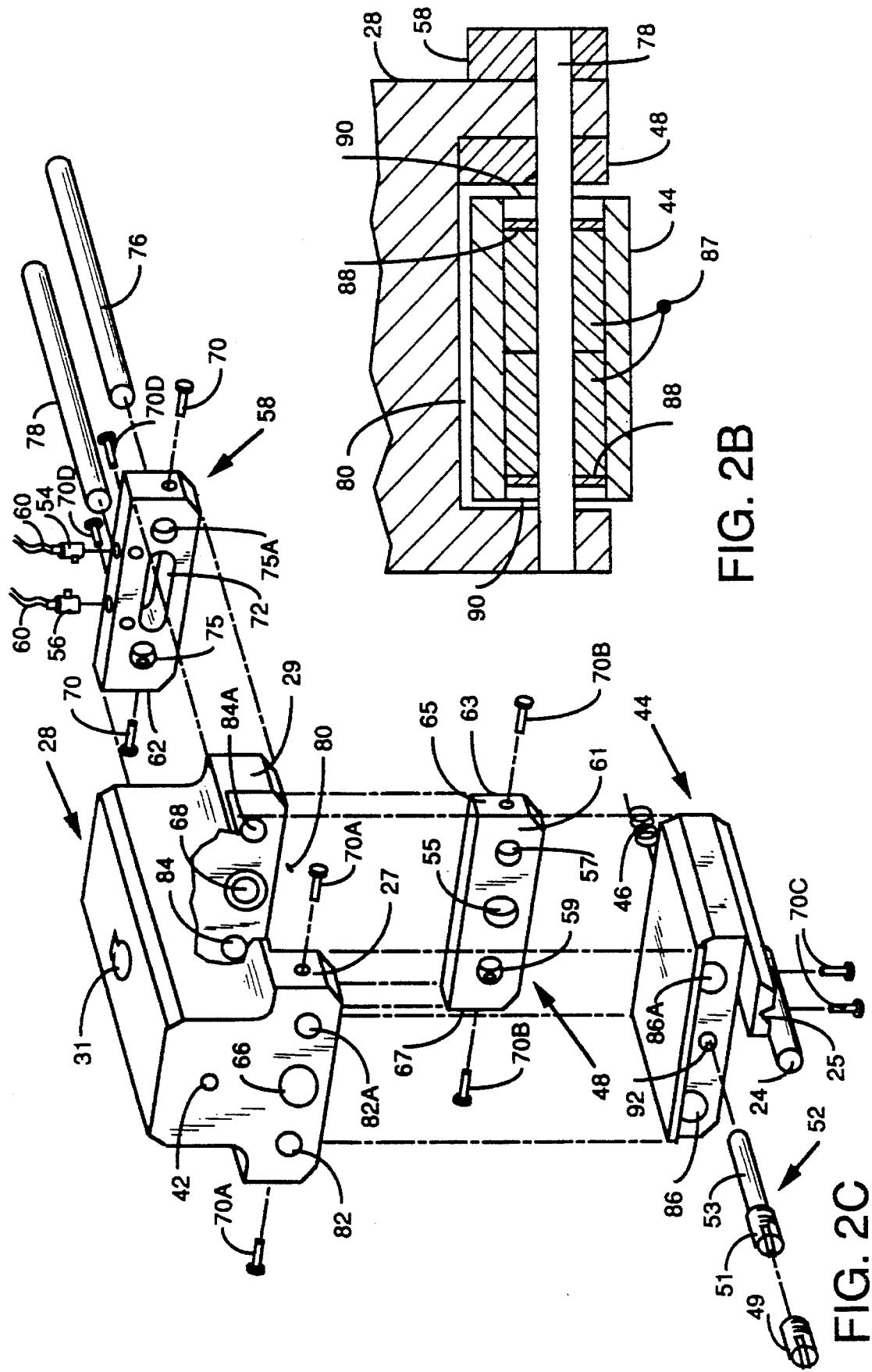

AUTOMATIC PELLET STACK LENGTH RECORDING SWITCH

BACKGROUND OF THE INVENTION

1. Field of the Invention

This invention is directed to a pellet stack length recording system, and more particularly to a nuclear fuel pellet stack segment length recording switch for automatically triggering a length measurement by the recording system.

2. Background Information

A nuclear fuel rod contains fissile material in the form of a plurality of generally cylindrical nuclear fuel pellets maintained in a row or stack thereof in the rod. One type of nuclear fuel rod, for example, is a zoned fuel rod which contains short lengths of "blanket" pellets at each end. Other fuel rod designs additionally have fuel pellets stacked in three or more zones of different pellet types including end zones of the blanket pellets. The different types of the fuel pellets include natural, enriched and enriched coated.

Fuel stacks for nuclear fuel rods may be collated by an automatic or a manual system. An example of an automatic system is disclosed in U.S. Pat. No. 4,842,808 issued Jun. 27, 1989 to Stuart L. Rieben et al. entitled "Nuclear Fuel Pellet Collating System" and assigned to the assignee of the present invention, which is herein incorporated by reference.

The manual collating system consists of an operator work area for handling pellets, input pellet trays, and output pellet trays. The manual collating system further consists of linear measuring equipment having a linear scale, a standard commercial weight scale, a barcode reader, and a local data collection computer. The operator work area includes an angled table about which is conveniently mounted the input pellet tray, the output pellet tray, the linear measuring equipment, and the weight scale.

The linear measuring equipment includes a support frame having an X-Y positioning device and a digital scale. The X-Y positioning device supports a measuring arm, a measuring head and a measuring probe. The operator positions the measuring probe in order to obtain measurements from the digital scale. The digital scale records the X coordinate length and transmits the length measurement to the local data collection computer.

The weight scale includes a fixture for supporting the output pellet tray during a weighing operation. The weight scale transmits the weight measurement to the local data collection computer.

The barcode reader is connected to the local dam collection computer and provides an error free identification of the input material (e.g., the pellets). The corrugated metal input pellet trays hold the pellets and include barcode identification labels. Whenever the identification labels are scanned by the barcode reader, the reader transmits the identification of the input material to the local data collection computer in order to verify the type of material prior to use at the operator work area.

The local data collection computer, such as a desk top IBM compatible personal computer, prompts the operator during the collating process, records and verifies the pellet stack segment length and weight measurements which are taken by the operator during the stack building process, and communicates the pellet and fuel rod data to an historical data collection computer.

Accurate pellet stack segment length measurements are essential for proper quality control and nuclear fuel rod operation. In the manual system, the length measurements are provided by the linear measuring equipment which includes the manually positioned measuring probe and the digital scale. Pellet stacks typically are assembled for a lot of 25 fuel rods at a time. The pellets for each lot are contained in special trays in a container or cassette. Due to the length of the cassette trays, each stack may consist of 9 or more segments. A typical 25 fuel rod lot, or one cassette, having 11 segments, requires 11 measurements to be recorded per rod, or 275 individual length measurements per cassette.

Pellets are separated on an input tray for the zone, or a segment of the zone, row by row for each of 25 rows on the tray. Each row represents a segment of a fuel stack. The pellets, separated for the zone or segment, are measured and recorded row by row, starting with the front row and moving to the rear row. The accuracy of the pellet stack segment linear measuring equipment is provided by a spring preload device which compresses the pellet stack segment, in order to eliminate gaps between pellets, and by a zero length check of the digital scale before and after a group of measurements. Whenever measurements are taken, the operator positions the measuring probe against an individual pellet stack segment, which compresses the spring preload device. Then, the operator actuates a foot switch, in order to signal the digital scale to transmit the length of the pellet stack segment to the local data collection computer.

Although the system provides the capability for accurate length measurements, there is room for improvement. During manual operation, the operator may become overly familiar with the function of the manual system and quickly move through a relatively large number of pellet stack segment length measurements. In particular, the operator's hand - foot coordination may become non-synchronized and, hence, the spring preload device may not be fully compressed before the foot switch is depressed. Accordingly, measurement errors may result. Although these errors are detected by subsequent quality control inspections, rework, such as remeasurement of the pellet stack segments, is required.

There is a need, therefore, for a manual pellet stack segment measurement system that operates independently of the hand - foot coordination of an operator.

There is a more particular need for such a manual measurement system that consistently provides accurate pellet stack segment length measurements.

SUMMARY OF THE INVENTION

These and other needs are satisfied by the invention which is directed to a pellet stack segment length recording switch for automatically triggering a length measurement by a length measurement system. The measurement system includes a digital length scale having a manually positioned measuring arm and head, a spring loaded slider block slidably attached to the measuring head and having an adjustable sensor pin, a spring having a predetermined compression force for resisting movement of a leg of the measuring head toward the slider block, a measuring probe attached to the slider block for compressing the pellet stack segment, and a high resolution fiber optic sensor for sensing a position of the sensor pin.

The measuring arm is manually positioned, in order to jointly move the measuring head, the spring and the slider block, and to position the measuring probe at an end of the pellet stack segment. Whenever the measuring probe contacts the end of the pellet stack segment, any manual compression force applied to the measuring arm moves the measuring head, the spring, the slider block and the measuring probe, and compresses the end of the pellet stack segment. Whenever a sufficient force, which is smaller than the predetermined compression force of the spring, is manually applied, the pellet stack segment is compressed and any gaps between the pellets are eliminated. As such smaller force is applied, the measuring head compresses the spring and moves toward the slider block. Then, whenever the predetermined compression force is applied, the measuring head further compresses the spring and moves closer to the slider block.

The position of the sensor pin of the slider block is adjusted, in order that whenever the predetermined compression force of the spring is applied, the fiber optic sensor detects the position of the sensor pin, with respect to the measuring head. The fiber optic sensor, in turn, triggers the digital length scale, in order to transmit the length of the pellet stack segment to a data collection computer. In this manner, any operator hand - foot coordination error is eliminated from the length measurements. Accordingly, accurate and consistent length measurements are provided by the length measurement system.

BRIEF DESCRIPTION OF THE DRAWINGS

A full understanding of the invention can be gained from the following description of the preferred embodiments when read in conjunction with the accompanying drawings in which:

FIG. 2B is a vertical cross-sectional view, taken along line 2B—2B of FIG. 1D, of the measuring head and a slider block in accordance with the invention;

FIG. 2C is an exploded isometric view of the measuring head and the slider block of FIGS. 2A–2B;

DESCRIPTION OF THE PREFERRED EMBODIMENT

Figure 1A:
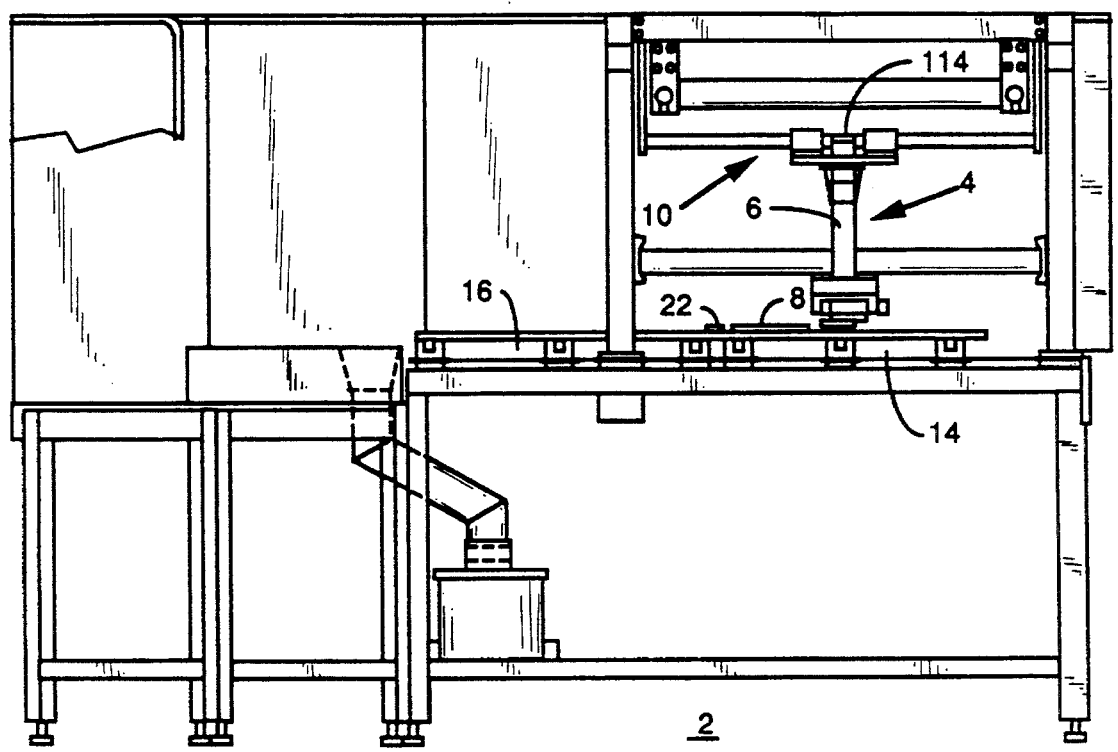
FIGS. 1A–1B, respectively, are a front view (along an X-axis) and a side view (along a Y-axis) of an X-Y positioning table utilizing a measuring arm.
Figure 1B:
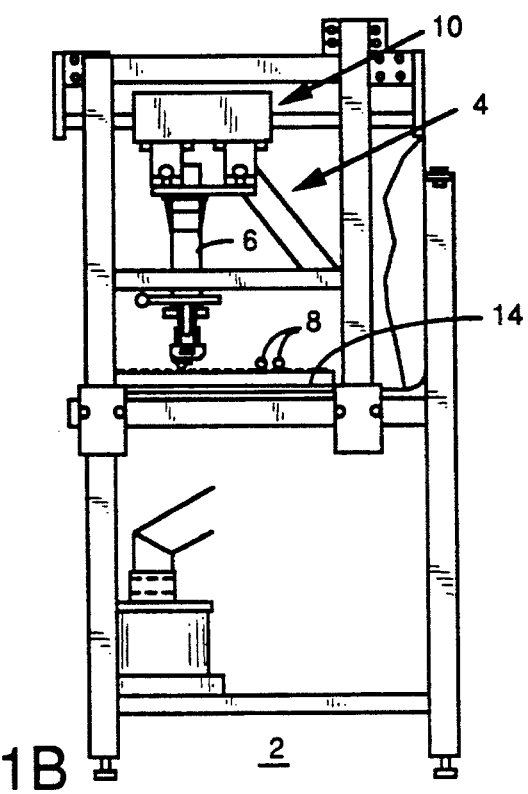

FIGS. 1A–1B illustrate a manual nuclear fuel pellet collating and measuring station 2 and include, respectively, a front X-axis view and a side Y-axis view of an X-Y positioning table 4 utilizing a measuring arm 6. An operator uses the station 2 to assemble various columnar pellet stack segments 8 in a variety of stack configurations. The station 2 further includes a measuring device 10. The measuring device 10 responds to X-Y positions of the measuring arm 6 and has a linear scale 114 which, in the exemplary embodiment, is capable of measuring pellet stack segments 8, which are up to 23 inches in length, with a resolution of±0.004 inch.

Figure 1C:
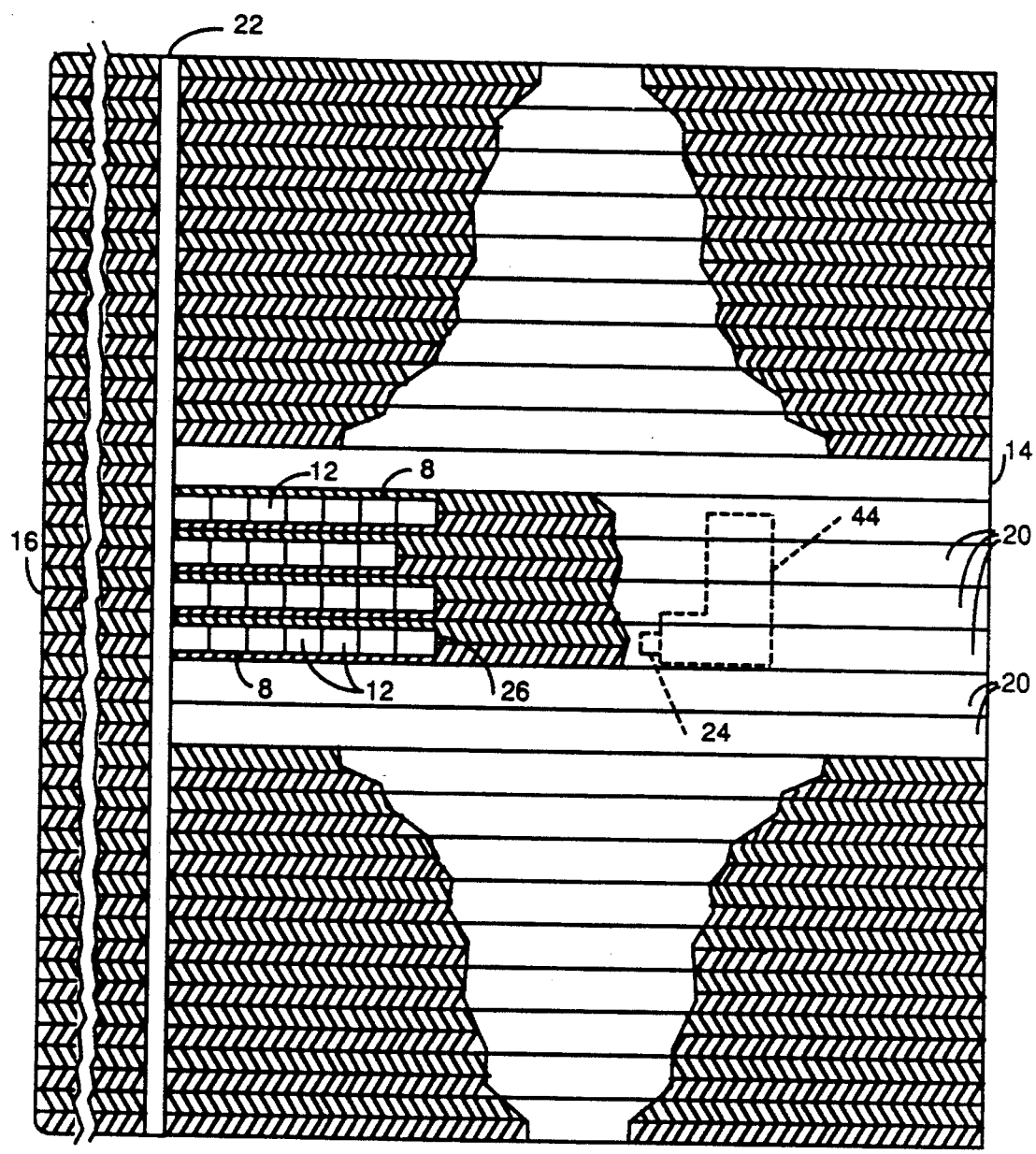
FIG. 1C illustrates rows of pellet stack segments on an input tray.

Referring now to FIG. 1C, a plurality of nuclear fuel pellets 12 are positioned on an input tray 14. The manual collating process generally includes handling of a plurality of pellet input and output trays, such as the exemplary pellet input tray 14 and an exemplary pellet output tray 16, pellet manipulation to assemble the pellet stack segments 8, data entry and data manipulation (e.g., stack weight, stack length, pellet tray identification and operator identification) in a data collection computer 110 (see FIG. 3), and data transactions with an historical data collection computer (RAMS) 118 (see FIG. 3).

The pellet stack segments 8 are measured on the input tray 14 and then are transferred to the output tray 16. The exemplary input tray 14 includes 25 parallel triangular grooved rows 20 for holding individual pellet stack segments 8. A comb type reference stop 22 is used to block transfer of the pellet stack segments 8 from the input tray 14 to the output tray 16 during length measurements. Later, the stop 22 is moved in order to transfer the stack segments 8 to the output tray 16.

Referring now to FIGS. 1C–2A, the measuring arm 6 includes an attached cylindrical measuring probe 24. The measuring arm 6 and the attached probe 24 are moved into an X-Y position, above the input tray 14, at an end 26 of an individual pellet stack segment 8. A measuring head 28 is attached to the measuring arm 6 by a pair of levers 38 and is moveable in a vertical Z-direction by a handle 32. The handle 32 is attached to an end 33 of a lever 34 which pivots about a hinge 36. For simplicity, operation of only one of the levers 38 is described below, it being understood that the other lever 38 operates in a similar manner. As shown in FIGS. 1D and 1E, the lever 34, in turn, is pivotally connected to the lever 38 at an end 40 thereof. The lever 38 is pivotally connected at another end 42 to the measuring head 28. FIGS. 1D and 1E show the measuring head 28 in a lowered position and a raised position, respectively.

The cylindrical probe 24 has a diameter approximately the same as a diameter of the nuclear fuel pellets 12. The probe 24 may be lowered into an individual row 20 of the input tray 14 adjacent the stop 22, or adjacent the end 26 of a segment 8. As will be explained in greater detail with FIGS. 3 and 5 below, length measurements include, first, a zero length calibration, where probe 24 of measuring arm 6 is positioned against the stop 22; second, a series of pellet stack segment length measurements at the end 26 of each segment 8; and third, a zero length measurement which verifies the first length calibration.

Figure 1D:
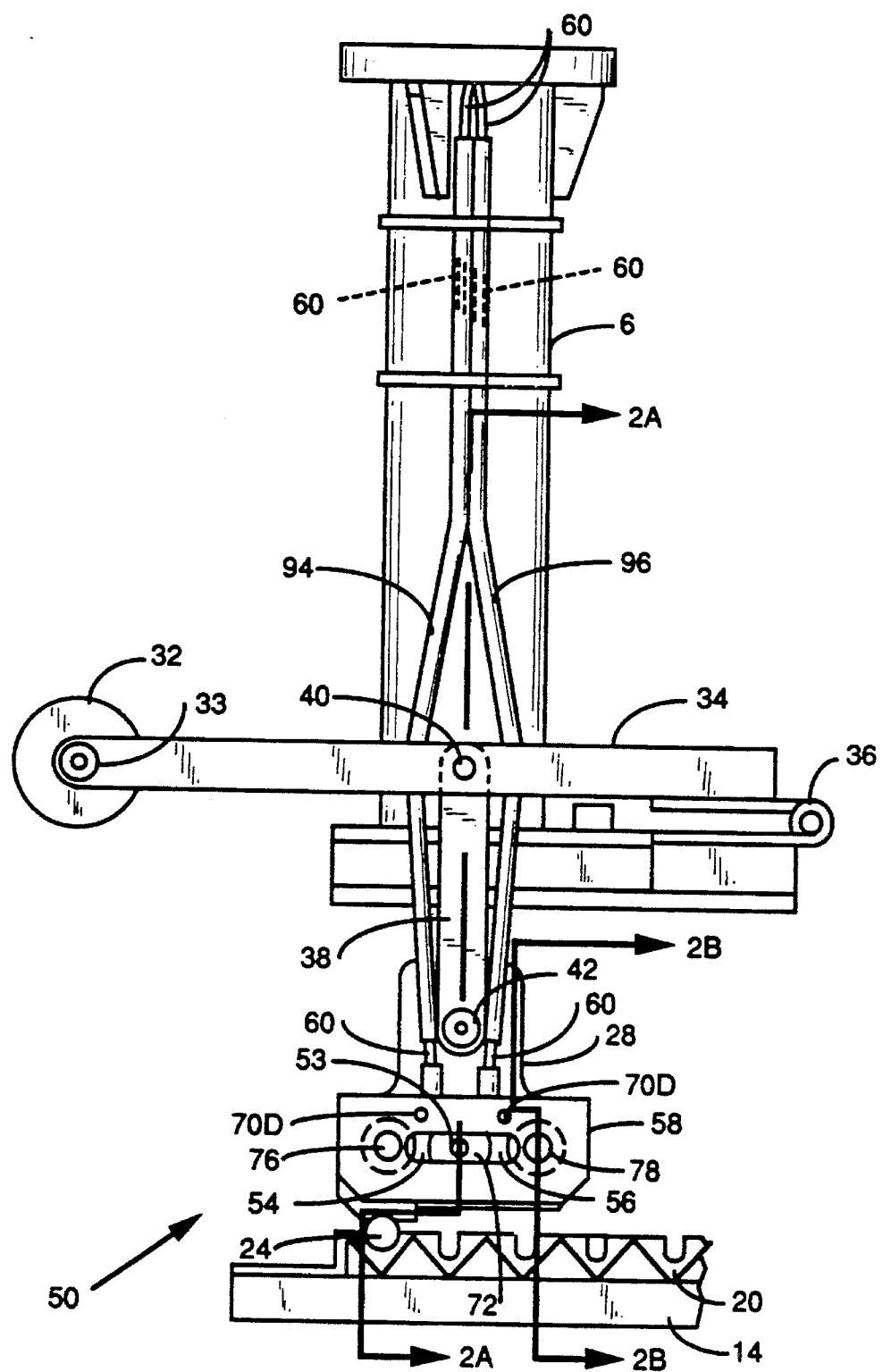
FIG. 1D is an expanded view of the measuring arm of FIG. 1B which has a measuring head in a lowered position.
Figure 1E:
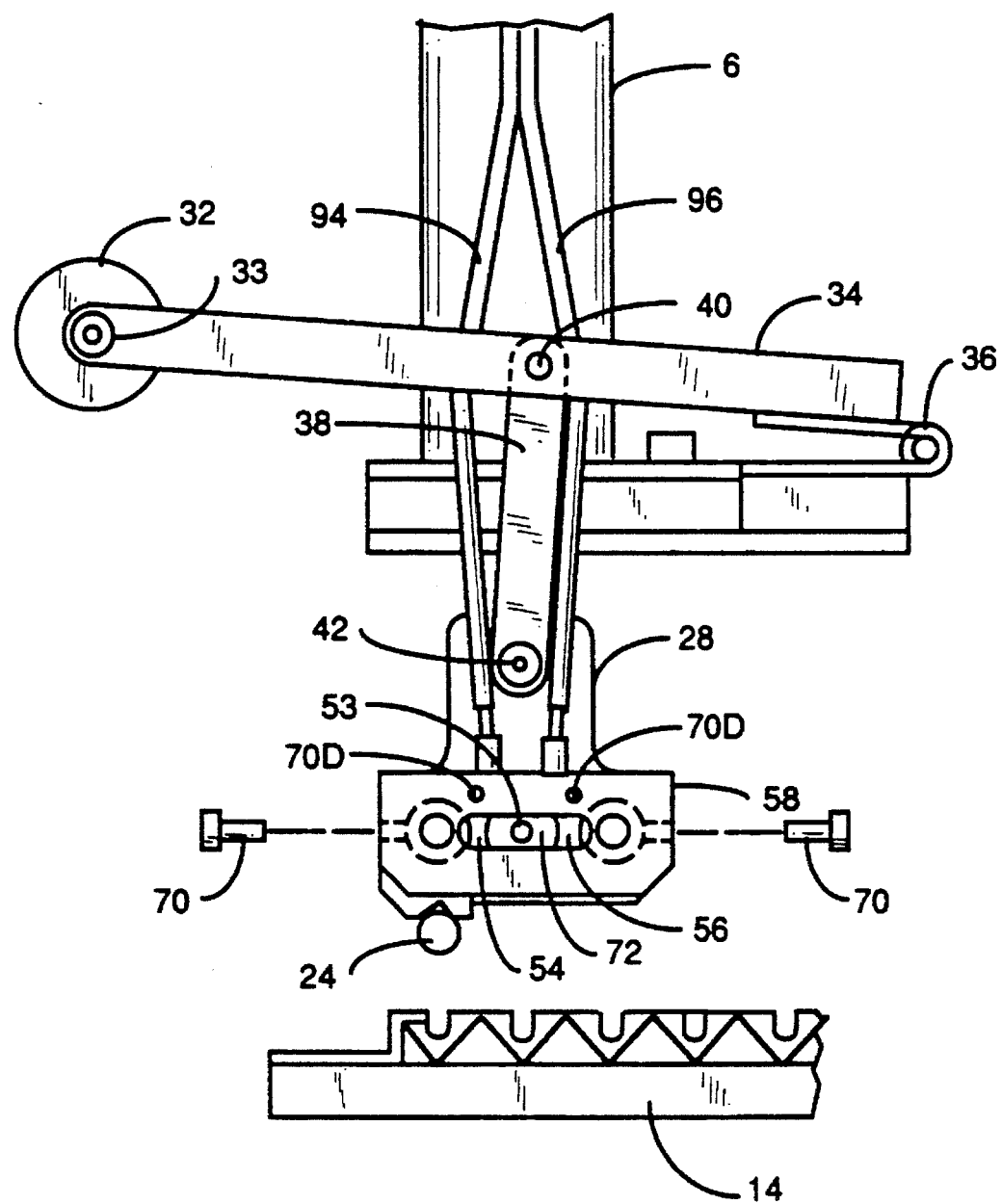
FIG. 1E is an expanded view of the measuring arm of FIG. 1B which has a measuring head in a raised position.
Figure 2A:
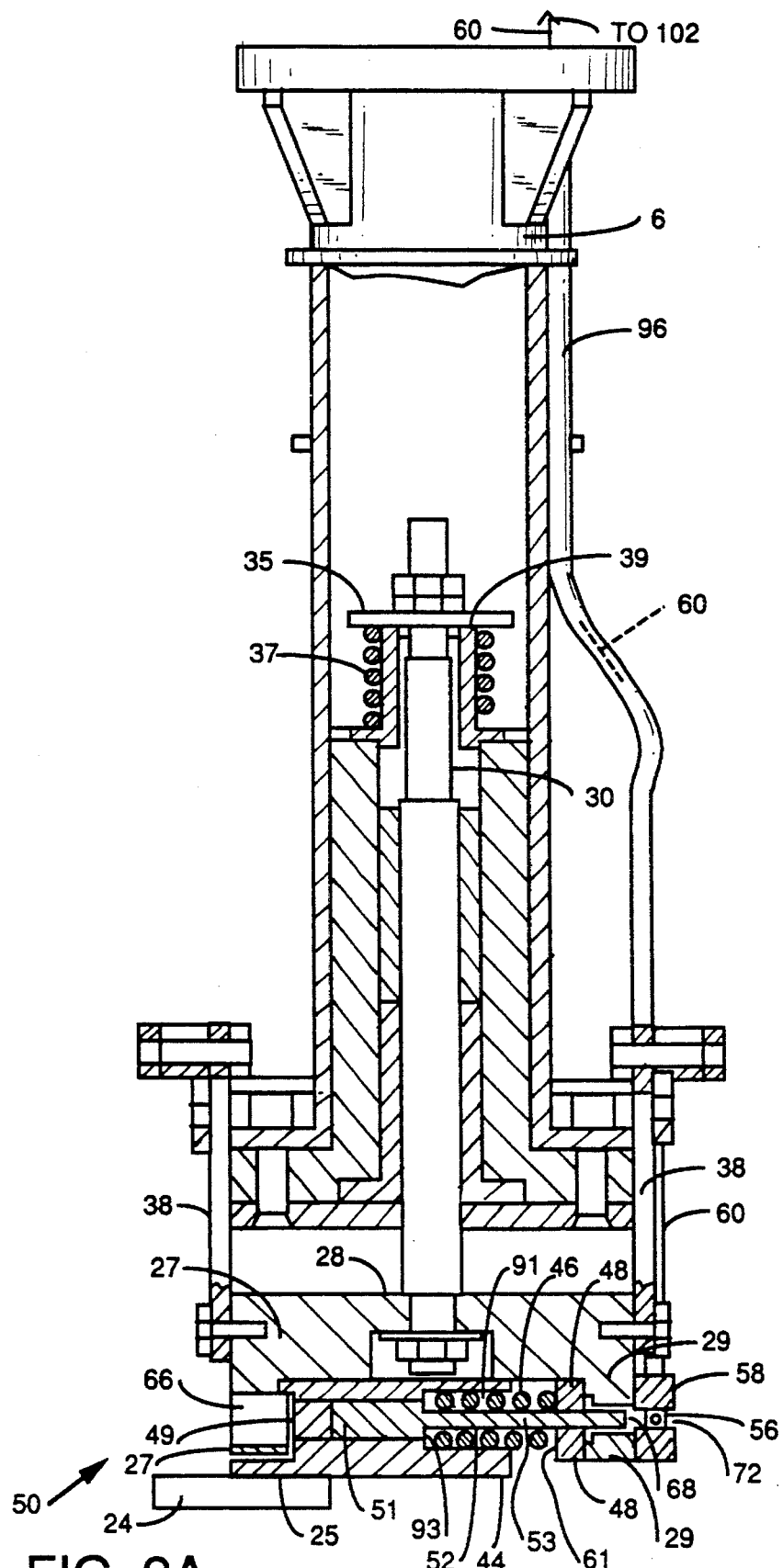
FIG. 2A is a vertical cross-sectional view, taken along line 2A—2A of FIG. 1D, of the measuring head and a slider block in accordance with the invention.
Figure 3:
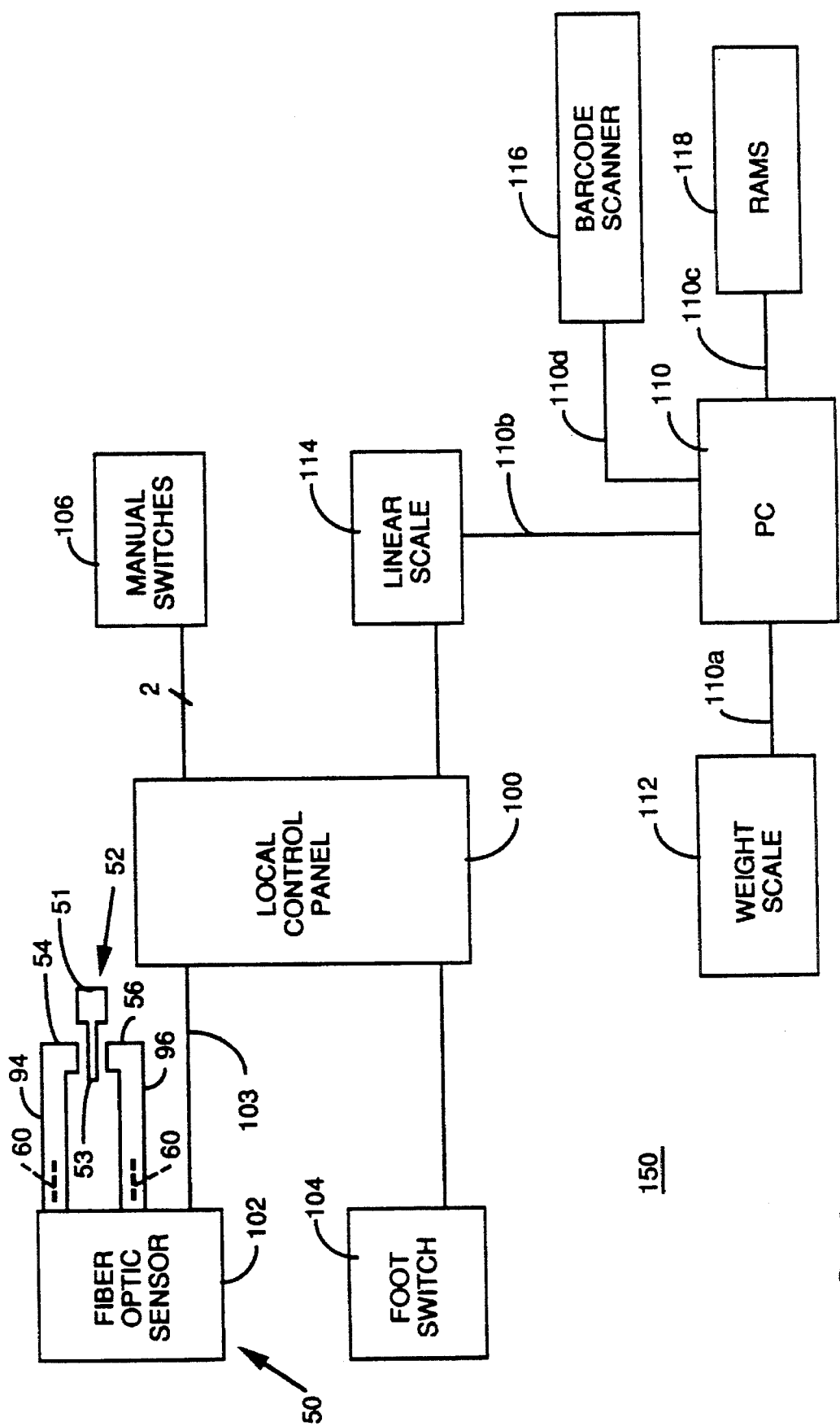
FIG. 3 is a block diagram of a manual measuring system having a local control panel and a data collection computer in accordance with the invention.

Referring to FIGS. 1D and 2A, an exemplary automatic pellet stack length recording switch 50 includes the cylindrical probe 24, a slider block 44, a spring 46, a generally rectangular spacer 48, a fiber optic sensor trip screw 52, two fiber optic reflectors 54,56, a sensor mount 58, two fiber optic cables 60 and a fiber optic sensor 102 (see FIG. 3). The generally inverted-U-shaped measuring head 28 has two legs 27,29 and is connected to the measuring arm 6 by a central rod 30. The rod 30 is attached to a central mounting hole 31 (see FIG. 2C) of the measuring head 28. As discussed above, the rod 30 and the attached measuring head 28 are movable in the vertical Z-direction. As shown in FIG. 2A, whenever the measuring head 28 is lowered by the handle 32 (see FIG. 1D), a washer 35 attached to an end of the rod 30 compresses a spring 37 until the washer 35 contacts a shoulder of a spacer 39 within the measuring arm 6. Otherwise, the measuring head 28 is normally raised under the influence of the spring 37.

Two central cylindrical bores 66,68 are bored through the two legs 27,29, respectively, along a longitudinal axis of the measuring head 28. The sensor mount 58 has an oblong-shag opening 72 which is open along the longitudinal axis of the central bores 66,68. A longitudinal axis of the oblong-shaped opening 72 is perpendicular to the longitudinal axis of the bores 66,68.

Referring now to FIGS. 2A–2C, the measuring head 28 has two sets of off-center cylindrical bores 82–82A,84–84A bored through the two legs 27,29, respectively, along a longitudinal axis. The slider block 44 has two off-center cylindrical bores 86,86A. Similarly, the sensor mount 58 has two off-center holes 75,75A. The holes 75,75A of the sensor mount 58 and the bores 86,86A of the slider block 44 are positioned on the longitudinal axis of the bores 82–84, 82A–84A, respectively, of the measuring head 28.

The sensor mount 58 is attached by two set screws 70 to two pins 76,78. The pins 76,78 pass through the bores 82A–84A,82–84, respectively, of the measuring head 28. The two pins 76,78 slidably support the slider block 44 within a cut out 80 between the legs 27,29 of the measuring head 28. For simplicity, operation of only pin 78 is described below, it being understood that the other pin 76 operates in a comparable manner. Similarly, only one of the bores 86 of the slider block 44 and only one of the holes 75 of the sensor mount 58 are described below. The pin 78 is fixedly attached using a set screw 70A within the bore 82 of the leg 27 of the measuring head 28 and using the set screw 70 within the hole 75 near the side 62 of the sensor mount 58. The pin 78 passes through the off-center hole 59 of the spacer 48 and is fixedly attached using a set screw 70B at an end 67 of the spacer 48. Two cylindrical beatings 87 within opposite halves of the bore 86 surround the pin 78 which slidably supports the slider block 44. Two retaining rings 88, near the opposite ends of the bore 86, hold the bearings 87 in place within the bore 86. Two bushing seals 90 seal the ends of the bore 86. The off-center bores 82,84,86 and the off-center hole 75 are parallel with the central bores 66,68 of the measuring head 28. In this manner, movement of the measuring head 28, with respect to the slider block 44, is along the longitudinal axis of the central bores 66,68.

The slider block 44 also has a central cylindrical bore 92 and a counter-bore 91 which are positioned on the longitudinal axis of the central bores 66,68 of the measuring head 28. The trip screw 52, having a threaded head 51 and a shaft 53, is threadably attached by the head 51 within the bore 92. The shaft 53 of the trip screw 52 protrudes into the bore 68 of the measuring head 28. A set screw 49 is threadably attached within the bore 92 and is axially positioned next to the head 51 of the trip screw 52. As will be described more fully below, the trip screw 52 has an adjustable position within the bores 68,91,92.

The generally rectangular spacer 48 includes a central hole 55, two off-center holes 57,59 which are on opposite sides of the central hole 55, two longitudinal surfaces 61,63, and two end surfaces 65,67. The longitudinal surface 63 is adjacent the leg 29 of the measuring head 28. The central hole 55 is positioned on the longitudinal axis of the central bores 66,68. The hole 55 and the bore 68 have diameters which are larger than a diameter of the shaft 53 of the trip screw 52. The shaft 53 freely passes through the hole 55 without contacting the spacer 48. Furthermore, the shaft 53 freely passes through the bore 68 and enters the opening 72 without contacting the sensor mount 58. As described above, the spacer 48 is attached to the pins 76,78 by set screws 70B through the end surfaces 65,67, respectively.

Continuing to refer to FIGS. 2A–2C, the spring 46 is positioned around the shaft 53 of the trip screw 52 and within the counter-bore 91 of the slider block 44. The spring 46 has an end which abuts an inner surface 93 of the counter-bore 91 and another end which abuts the surface 61 of the spacer 48. The spring 46 is selected to provide a predetermined compression force to resist a movement of the measuring head 28 and the spacer 48 toward the slider block 44. The surface 61 of the spacer 48 provides an end stop for movement of the spacer 48 toward the slider block 44.

The cylindrical probe 24 is affixed to a lower grooved alignment surface 25 of the slider block 44 by two set screws 70C. As will be described in greater detail below, an operator moves the measuring arm 6, in order that the probe 24 contacts and compresses an end 26 of a pellet stack segment 8 (see FIG. 1C). In this manner, the combination of the measuring arm 6, measuring head 28, spacer 48, spring 46, slider block 44 and probe 24 are used to apply a compression force to the end 26 of the pellet stack segment 8 for each length measurement.

After a compression force is applied by the probe 24, in response to operator movement of the measuring arm 6, the measuring head 28 and the spacer 48 move left, with respect to the slider block 44 of FIG. 2A, and compress the compression spring 46. In the same manner, the sensor mount 58 also moves left with respect to the shaft 53 of the trip screw 52. Before the predetermined compression force is applied, and before the spacer 48 contacts the slider block 44, the shaft 53 enters the opening 72 of the sensor mount 58. In the event that a compression force greater than the predetermined compression force is applied, the spacer 48 contacts the slider block 44. This restricts any further motion of the measuring head 28 toward the slider block 44.

Two protective tubes 94 (see FIG. 1D) and 96 are routed along a side of the measuring arm 6 and each contain the fiber optic cable 60. Sufficient slack is provided in the cables 60 to permit a full range of vertical motion of the measuring head 28. The fiber optic cables 60 terminate in the fiber optic reflectors 54,56. The fiber optic reflectors 54,56 are secured within the sensor mount 58 using two set screws 70D. As will be discussed more fully with FIGS. 3–4, a beam of light originates in the fiber optic sensor 102 (see FIG. 3). The light beam passes through the fiber optic cable 60 within tube 94 and is reflected perpendicular to the longitudinal axis of the bores 66,68 by the reflector 54 (see FIG. 1D) within the opening 72 of the sensor mount 58. Within the opening 72, the light beam passes to the corresponding reflector 56 which reflects the light beam into the fiber optic cable 60 within tube 96. Finally, the light beam is received by the fiber optic sensor 102. Whenever the predetermined compression force is applied, the shaft 53 of the trip screw 52 enters the opening 72 and breaks the light beam. The fiber optic sensor 102 detects the broken light beam, which signifies that the measuring head 28 is properly positioned. In turn, an output 103 (see FIG. 3) of the sensor 102 triggers a length measurement. It being understood that the invention is applicable to other types of position sensors (e.g., a proximity switch, a limit switch, etc.).

The trip screw 52 is adjusted, in order that the shaft 53 of the trip screw 52 breaks the light beam whenever the predetermined compression force is applied. The set screw 49 is inserted through the bore 66 of the measuring head 28 and is threadably attached within the bore 92 of the slider block 44. The set screw 49 is adjacent the head 51 of the trip screw 52, in order to prevent any back-off of the trip screw 52 within the bore 92 of the slider block 44.

The manual measuring system 150 of FIG. 3 includes a local control panel 100 and an exemplary data collection computer, such as conventional personal computer (PC) 110. The local control panel 100 is interconnected with the fiber optic sensor 102, a foot switch 104, two manual switches 106, and the linear scale 114. The PC 110 is interconnected by standard RS-232 interfaces 110a-1 10c with a weight scale 112, the linear scale 114, and the historical computer (RAMS) 118, respectively. The PC 110 is further interconnected by an interface, such as the exemplary keyboard interface 110d with a barcode scanner 116. The two manual switches 106 are used for selecting an automatic or a manual mode of operation (AUTO/MAN) and for manually activating an output of the interface 110b of the linear scale 114 (MANUAL TRANSMIT LENGTH).

The PC 110, in order to determine a length of a stack segment, prompts the operator to conduct a series of length measurements. The first measurement is the zero length measurement at the stop 22 (see FIG. 1C). Using interface 110b, the PC 110 instructs the linear scale 114 to calibrate a "zero length" using this zero length measurement. The second measurement is one of the stack segment length measurements at the end 26 of each segment 8 (see FIG. 1C). After all of the stack segment length measurements are completed, a final zero length measurement is performed at the stop 22 in order to verify that the linear scale 114 returns a "zero length" within a predetermined tolerance.

Figure 4:
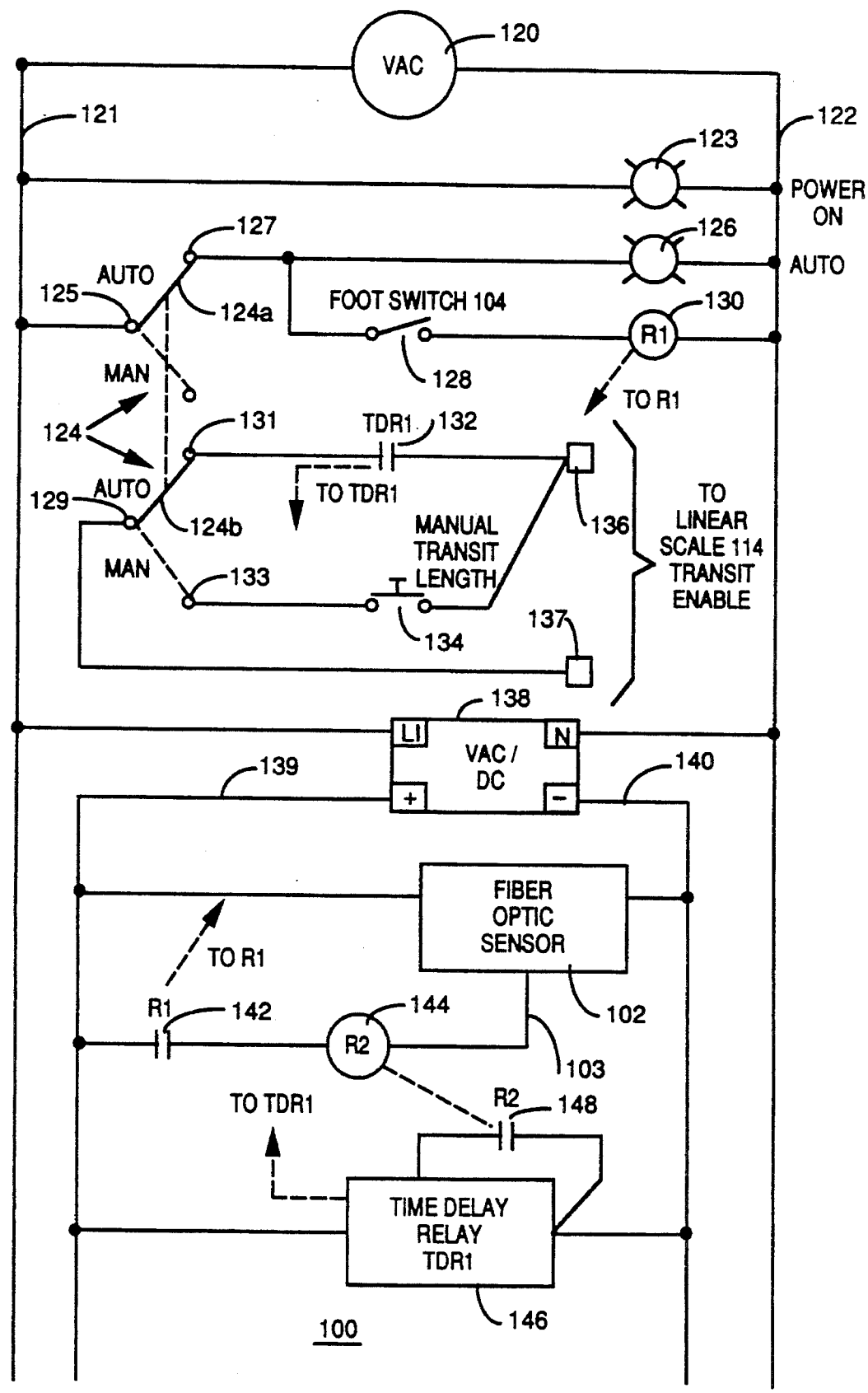
FIG. 4 is a circuit diagram of the local control panel of FIG. 3.

FIG. 4 is a circuit diagram of the local control panel 100. Power for the local control panel 100 is provided by a suitable alternating current power source (VAC) 120 on power leads 121,122. The POWER ON status of the power source 120 is indicated by a lamp 123 connected across the power leads 121,122. A dual switch 124 for selecting an automatic (AUTO) or a manual (MAN) operation mode of local control panel 100 includes two individual switches 124a, 124b. Whenever switch 124a is in the automatic position, terminal 125, which is connected to power lead 121, is connected to terminal 127, and the automatic status of panel 100 is indicated by a lamp 126 through a circuit to power lead 122. A relay coil (R1) 130 is connected between power lead 122 and a contact 128 of the foot switch 104. The contact 128 is connected between the coil 130 and terminal 127. Whenever switch 124a is in the automatic position, power lead 121 and terminal 125 are connected to terminal 127, and the closure of foot switch contact 128 energizes the coil 130 through a circuit to power lead 122. On the other hand, whenever switch 124a is in the manual position, terminal 127 is disconnected from power lead 121, the lamp 126 is extinguished to signify the manual mode of panel 100, the foot switch contact 128 is disabled, and power to the coil 130 is disconnected.

Whenever switch 124b is in the automatic position, terminal 129 is connected to terminal 131, and a relay contact (TDR1) 132 is connected across terminals 136,137 for presentation to a transmit enable input of linear scale 114. Whenever terminals 136,137 are interconnected (e.g., whenever contact 132 is closed in the automatic mode of panel 100), linear scale 114 transmits an RS-232 message representative of a length measurement of stack segment 8 (see FIG. 1C). On the other hand, whenever switch 124b is in the manual position, terminal 129 is connected to terminal 133, and a manual transmit length switch 134 is connected across terminals 136,137 for presentation to the transmit enable input of linear scale 114. Accordingly, length measurements may be requested in the manual mode of operation by closing switch 134, and may be requested in the automatic mode of operation whenever contact 132 is closed.

An alternating-to-direct current power supply (VAC/DC) 138 generates a direct current (DC) voltage at terminals 139,140 from the AC voltage of power leads 121,122. In the exemplary embodiment, a 120 VAC to+24 VDC power supply is utilized. Terminals 139,140 provide DC power and ground, respectively, to fiber optic sensor 102. The output 103 of the fiber optic sensor 102 is suitable for energizing a DC relay coil (R2) 144 whenever the light beam associated with the sensor 102 is broken. Whenever the light beam is broken, output 103 is driven to the DC ground reference of terminal 140. In this manner, a circuit is formed between DC power terminal 139, a relay contact (R1) 142, coil 144, output 103 and DC ground terminal 140. In other words, in the automatic mode, whenever the light beam is broken and foot switch contact 128 is closed, then relay coil (R1) 130 is energized, contact 142 is closed and relay coil (R2) 144 is energized. A relay contact (R2) 148 is driven by coil 144 and is interconnected with a time delay relay (TDR1) 146. The exemplary time delay relay 146 has an adjustable time delay range of 0.1 through 10 seconds on deenergization. On the other hand, the relay 146 generally has no delay on energization.

In the automatic mode, whenever foot switch contact 128 is closed, coil 130 is energized and contact 142 is closed. Then, whenever the light beam is broken, coil 144 is energized, contact 148 is closed, time delay relay 146 is energized and contact 132 is closed. In this manner, terminals 136,137 are interconnected and linear scale 114 outputs a length measurement, in the automatic mode, whenever the operator depresses foot switch 104 and the light beam is broken, which signifies that the measuring head 28 (see FIG. 2A) is properly positioned. The exemplary adjustable time delay of 0.1 to 10 seconds maintains contact 132 in a closed state for the adjusted time delay. This ensures that spurious length measurements are not provided in the event of contact bounce in contacts 128,142,148, or in the event the light beam is only partially broken.

Figure 5:
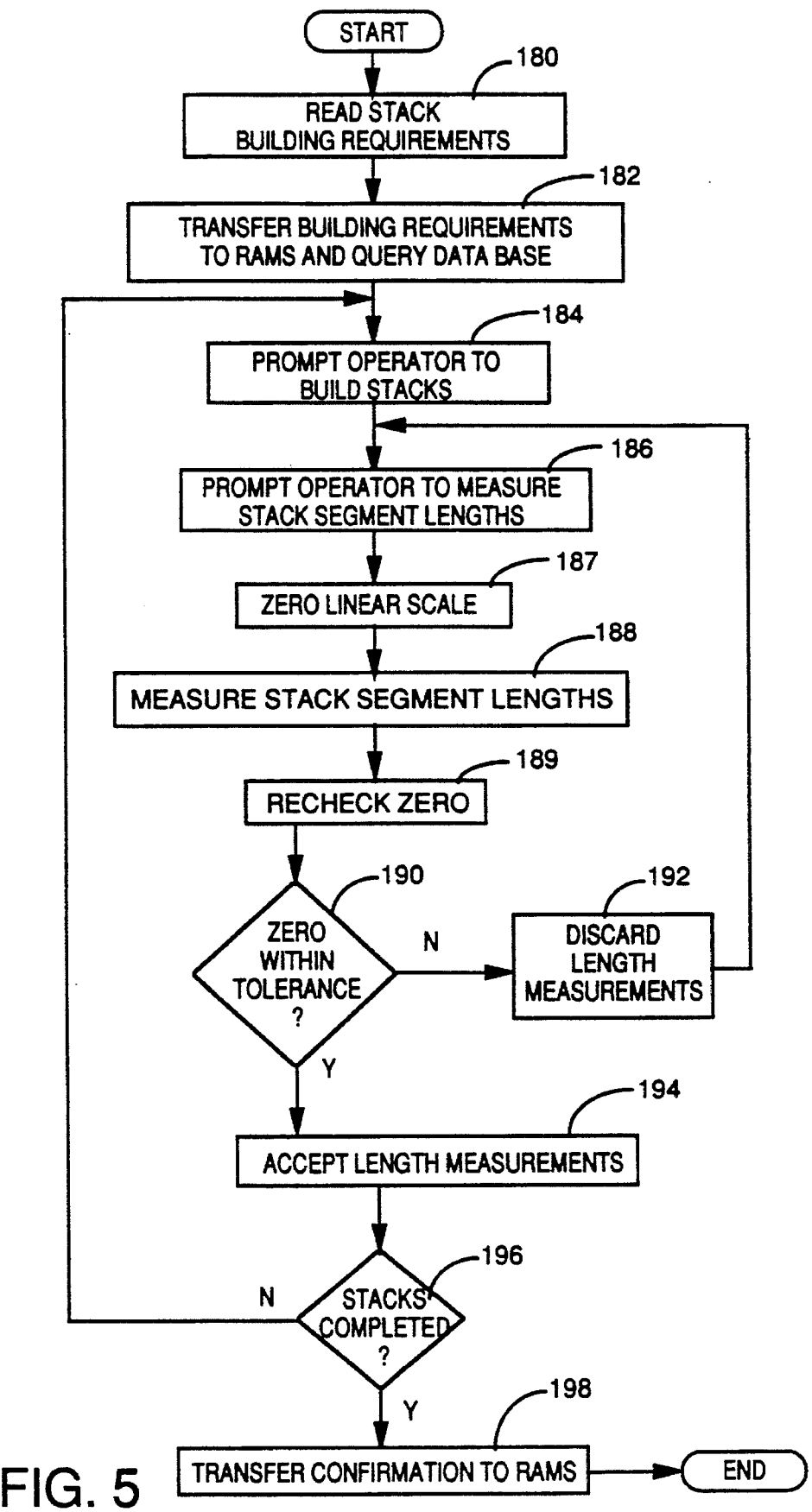
FIG. 5 is a flowchart of a software routine executed by the data collection computer of FIG. 3.

Referring now to FIGS. 1C, 3 and 5, PC 110 executes a software routine, in order to determine length measurements of individual pellet stack segments 8. At step 180, the PC 110 prompts the operator and reads various stack building requirements from operator entry. Then, at step 182, the stack building requirements are transferred to RAMS 118. Also, a data base in RAMS is accessed in order to identify the appropriate set of input trays 14. Next, at step 184, based on the stack building requirements, the PC 110 prompts the operator to begin building up to 25 stacks. At step 186, the PC 110 prompts the operator to begin to measure the stack segment lengths. Next, at step 187, the operator is prompted to perform a zero length calibration at stop 22 in order to calibrate the linear scale 114. At step 188, the operator is prompted to perform up to 25 length measurements at the end 26 of each of the pellet stack segments 8 on the input tray 14. Then, at step 189, the operator is prompted to perform a zero length measurement which verifies the first zero length calibration. A test, at step 190, determines whether the zero length measurement is within a predetermined tolerance value. If not, then the length measurements are discarded at step 192 and step 186 is repeated in order to prompt the operator to repeat the stack segment length measurements. Otherwise, if the zero length measurement is within the predetermined tolerance value, the length measurements are accepted and saved at step 194. At step 196, the PC 110 determines whether all of the stacks are completed based on a comparison of the length measurements with the stack building requirements. If the stacks have not been completely built and measured, then step 184 is repeated in order to prompt the operator to continue building the stacks. Otherwise, when the stacks are completed, a confirmation which signifies that the stack building procedure is finished is transferred to RAMS 118 at step 198 before the software routine exits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A manual measuring system for measuring a length of a nuclear fuel pellet stack segment along a longitudinal axis thereof, said system comprising:

manually movable measuring head means having two legs;

positioning means for positioning said manually movable measuring head means to at least one position along the longitudinal axis of the pellet stack segment, said manually movable measuring head means providing a compression force for comprising the pellet stack segment;

measuring means for measuring the length of the pellet stack segment from the position of said manually movable measuring head means;

compression means for compression by the compression force of said manually movable measuring head means, said compression means having a predetermined compression force;

probe means cooperating with said compression means for contacting an end of the pellet stack segment and applying the compression force of said manually movable measuring head means to the end of the pellet stack segment, said probe means including slider block means for compressing said compression means and also including a probe member attached to the slider block means for contacting the end pellet stack segment, said compression means and the slider block means being located between the legs of said manually movable measuring head means, the slider block means sliding toward one of the legs of said manually movable measuring head means in response to the compression force of said manually movable measuring head means; and sensing means cooperating with said manually movable measuring head means for sensing a position of the slider block means and outputting a signal, representative of the position of the slider block means, for triggering a measurement by said measuring means of the length of the pellet stack segment, whenever the compression force of said manually movable measuring head means is at least equal to the predetermined compression force of said compression means.

2. The measuring system as recited in claim 1, wherein said compression means is a compression spring which is biased between the slider block means and one of the legs of said manually movable measuring head means.

3. The measuring system as recited in claim 2, wherein the compression spring is compressed and the slider block means is slidably mobile with respect to said manually movable measuring head means along the longitudinal axis of the pellet stack segment.

4. The measuring system as recited in claim 3, wherein the probe member is attached to a surface of the slider block means, and extends beyond the surface of the slider block means and outside the legs of said manually movable measuring head means.

5. The measuring system as recited in claim 4, wherein the probe member is cylindrical and has a diameter generally the same as a diameter of the pellet stack segment.

6. The measuring system as recited in claim 1, wherein said sensing means includes fiber optic sensor means having a bore associated with said movable measuring head means; wherein the slider block means includes pin means attached thereto and moveable therewith, the pin means including a trip screw for tripping the fiber optic sensor means in the bore thereof after the compression force of said manually movable measuring head means exceeds the predetermined compression force of said compression means.

7. The measuring system as recited in claim 6, wherein the slider block means has a bore running therethrough, and wherein the pin means and said compression means are positioned within the bore of the slider block means.

8. The measuring system as recited in claim 7, wherein the trip screw means has an adjustable position within the bore of the slider block means, in order that the output signal representative of the position of the pin means triggers the measurement by said measuring means of the length of the pellet stack segment after the application of the predetermined compression force.

9. The measuring system as recited in claim 7, wherein the pin means further includes a set screw, and wherein the trip screw means has a head which is positioned adjacent the set screw within the bore of the slider block means, in order to prevent a back-off the trip screw means.

10. The measuring system as recited in claim 9, wherein one of the legs of said manually movable measuring head means has a a bore running therethrough, wherein the trip screw means also has a shaft which is positioned within the bore of the slider block means and within the bore of said one of the legs of said manually movable measuring head means.

11. The measuring system as recited in claim 10, wherein said manually movable measuring head means has spacing means for blocking movement of said manually movable measuring head means toward the slider block means, the spacing means having a hole, the shaft of the trip screw means passing through the hole of the spacing means, the spacing means adjacent one of the legs of said manually movable measuring head means and abutting an end of said compression means.

12. The measuring system as recited in claim 6, wherein said manually movable measuring head means moves, with respect to the slider block means and the trip screw means, in a direction generally parallel to the longitudinal axis of the pellet stack segment and generally toward the end of the pellet stack segment.

13. The measuring system as recited in claim 1, wherein said sensing means includes a fiber optic sensor.

14. The measuring system as recited in claim 13, wherein the length of the pellet stack segment is measured on a longitudinal axis of the pellet stack segment, wherein the fiber optic sensor has a light beam which is generally perpendicular to the longitudinal axis of the pellet stack segment, and wherein the light beam is intercepted by the pin means, in order to trigger a measurement by said measuring means of the length of the pellet stack segment at a positive adjustable time after the compression force of said manually movable measuring head means is at least equal to the predetermined compression force of said compression means.

15. The measuring system as recited in claim 14, wherein said pin means includes a trip screw having a shaft, and wherein the light beam of the fiber optic sensor is broker by a movement of said manually movable measuring head means toward the shaft of the trip screw.

16. The measuring system as recited in claim 1 wherein said positioning means is a positioning table means for positioning said manually movable measuring 17. The measuring system as recited in claim 1 wherein said sensing means includes foot switch means for triggering a measurement by said measuring means of the length of the pellet stack segment after the foot switch means is closed.

18. The measuring system as recited in claim 17, wherein said sensing means also includes a fiber optic sensor with a light beam which is broken by movement of the slider block means, said sensing means triggering a measurement by said measuring means of the length of the pellet stack segment whenever the foot switch means is closed and the light beam is broken.

* * * * *